March 22, 1927.

E. C. HARDESTY 1,621,981

MOUSE TRAP

Filed Nov. 9, 1926

Inventor
E. C. Hardesty.

By Lacey & Lacey, Attorneys

Patented Mar. 22, 1927.

1,621,981

UNITED STATES PATENT OFFICE.

EDWIN C. HARDESTY, OF ABERNATHY, TEXAS.

MOUSETRAP.

Application filed November 9, 1926. Serial No. 147,296.

This invention relates to fishing and trapping and more particularly to a trap of the spring actuated jaw type employed to catch mice, rats, and other small animals.

A trap of this type includes a base having a spring actuated jaw pivotally connected therewith and releasably held in a set position by a trigger, the trigger being moved to release the jaw when an animal attempts to eat the cheese or other bait carried by the trigger. Very often, when setting the trap, the holding bar which extends over the jaw and is engaged with the trigger, will slip out of proper engagement therewith and the jaw will be prematurely released and the fingers of the person setting the trap caught between the jaw and base. This causes painful injury to the fingers and if a rat trap is being set, may result in a broken finger.

Therefore, one object of the invention is to provide a trap of this character which may have its jaw moved to a set position and engaged with a bait-holding trigger without it being necessary to place the hands in such position that the fingers may become caught between the jaw and base.

Another object of the invention is to provide the jaw with a lever which may serve not only as means by which the jaw may be moved to a set position but also as means to engage the bait-holding trigger.

Another object of the invention is to provide a trap, the jaw and setting lever of which may be formed from a single strand of wire.

The invention is illustrated in the accompanying drawings, wherein.

Figure 3:
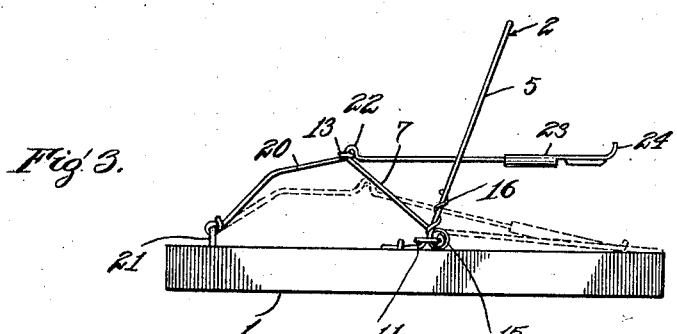
Figure 3 is a view in side elevation, showing the jaw in its set position and, by dotted lines, indicating the released position.

The trap constituting the subject matter of this invention includes a base 1, which is preferably wood but may be sheet metal or any other material desired. The jaw 2 is substantially rectangular in shape and consists of a strand of wire bent to form an outer cross bar 3 from the ends of which extend side bars 4 and 5. After the side bar 4 has been formed, the wire strand is bent inwardly to form a side section 6 of a rear cross bar and then bent rearwardly and back upon itself to form a setting lever 7. The setting lever will, therefore, be provided with spaced side strands 8 and 9, the strand 9 being bent to form a second side section 10 for the rear cross bar of the jaw. At its free end, the portion of the wire forming the side section 10 of the rear cross bar terminates in a hook 11 engaged in an eye 12 at the rear end of the side bar 5. It will thus be seen that the jaw, together with its setting lever, may be formed from a single strand of wire. The lever 7 is bent intermediate its length to form a side arm 13 which has its side strands twisted together, as shown at 14, in order to strengthen the side arm and prevent its strands from having movement toward and away from each other. Coiled springs 15 are disposed about the side portions 6 and 10 of the rear cross bar and have their outer end portions coiled about the side arms 4 and 5, as shown at 16, and their inner end portions 17 extending rearwardly in close proximity to each other so that when the jaw is pivotally connected with the base by means of staples 18, the inner end portions 17 may be secured to the base by one or more staples 19 and the springs serve to normally retain the jaw in the position indicated by dotted lines in Figure 3. The trigger 20 is also formed of wire and has one end portion loosely engaged with a staple 21 driven into the base adjacent the rear end thereof in alinement with the setting lever 7. The trigger extends forwardly between the side strands 8 and 9 of the lever and is bent or crimped to form an upwardly extending tooth 22 adapted to engage the lever at the inner end of its side arm and releasably hold the jaw in a set position. The trigger is of sufficient length to extend forwardly between the side bars of the jaw and at its forward end carries a bait holder 23 which is preferably formed of sheet metal and has its forward end portion cut to form fingers 24 which are bent upwardly so that bait may be securely held in engagement with the bait holder.

Figure 1:
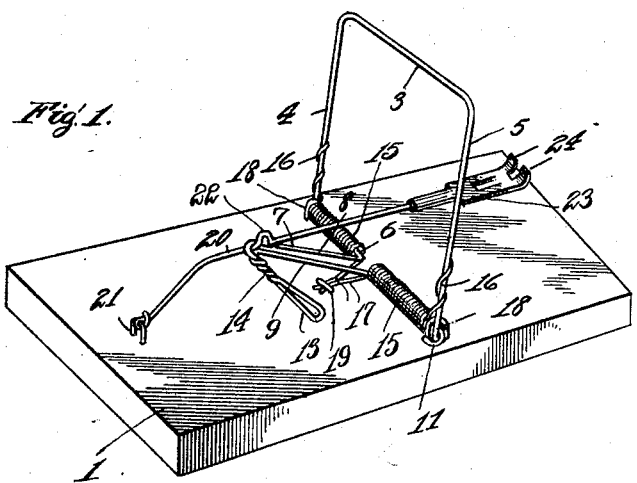
Figure 1 is a perspective view of the improved trap.
Figure 2:
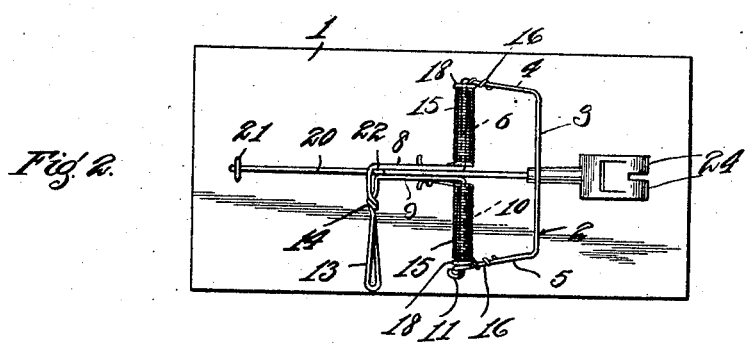
Figure 2 is a top plan view of the trap.

When the trap is to be set, the bait is applied to the bait holder and held thereon, either by having the fingers 24 embedded in it or by being wired or otherwise secured in place. The trap is then either held in the hand or placed upon a table or other support and pressure applied to the side arm 13 of the lever to swing the lever downwardly toward the rear end of the base. Rearward and downward movement of the lever imparts rotary motion to the rear cross bar of the jaw and causes the jaw to be swung upwardly against the action of the springs 15 from the position indicated by dotted lines in Figure 3, to the set position shown in full lines. The trigger is now grasped rearwardly of the lever and moved upwardly so that its tooth 22 is positioned to engage the inner end of the side arm as clearly shown in Figures 1 and 2. When so engaged, the jaw will be securely retained in a set position and prevented from moving downwardly until the trigger has been swung downwardly out of locking engagement with the side arm. When an animal attempts to eat the bait carried by the bait holder, the trigger is swung downwardly out of locking engagement with the setting lever and the springs will move the jaw downwardly and catch the animal between the jaw and base. This causes the animal to be killed by receiving a broken back or neck, or at least holds it in the trap until it can be killed and removed by the person who sets the trap. It is to be further noted, that when removing the animal from the trap the jaw may be swung upwardly to a releasing position and it is not necessary to touch the animal or the portion of the jaw gripping the animal with the fingers. I have, therefore, provided a trap which may be safely handled.

Having thus described the invention, what I claim is:

1. A trap comprising a base, a jaw pivoted to said base, spring means yieldably resisting upward movement of the jaw to a set position, a setting lever carried by and extending rearwardly from said jaw and formed with a side arm, and a trigger pivoted to the base and extending forwardly beyond the pivotal mounting of the jaw and provided with bait holding means, said trigger being adapted to engage said lever at the inner end of its side arm and releasably retain the jaw in a set position.

2. A trap comprising a base, a jaw pivoted to said base, spring means yieldably resisting upward movement of the jaw to set position, a setting lever carried by and extending rearwardly from said jaw and formed with spaced strands joined at their outer ends, and a trigger pivoted to said base and extending forwardly between the strands of said lever and beyond the pivotal mounting of the jaw and at its forward end provided with bait holding means, said trigger having a tooth adapted to engage said lever and releasably hold the jaw in a set position.

3. A trap comprising a base, a jaw pivoted to said base, spring means yieldably resisting upward movement of the jaw to set position, a setting lever carried by and extending rearwardly from said jaw and formed with spaced strands joined at their outer ends and bent intermediate their ends to form a side arm, and a trigger pivoted to said base and extending forwardly between the strands of said lever and terminating in bait holding means, said trigger having a tooth to engage the lever at the inner end of its side arm and releasably hold the jaw in a set position.

4. A trap comprising a base, a jaw pivoted to said base and including a rear cross bar bent to form a setting lever extending rearwardly therefrom intermediate its ends, said lever having side strands and being bent intermediate its length to form a side arm, springs coiled about the rear cross bar of said jaw and engaging the base and jaw to yieldably resist upward movement of the jaw to a set position, and a trigger pivoted to said base and extending forwardly between the strands of said lever and at its forward end provided with bait holding means, said trigger being bent to form a tooth adapted to engage said lever at the inner end of said side arm and releasably hold the jaw in a set position.

5. A trap comprising a base, a jaw consisting of a wire strand bent to form a forward cross bar, side bars extending rearwardly therefrom and a rear cross bar joining the side bars, said rear cross bar being bent intermediate its length to form a setting lever extending rearwardly therefrom and having spaced side strands, said lever being bent to form a side arm, the said arm having its strands twisted together, bearing members carried by said base and straddling the rear cross bar adjacent the side bars to pivotally mount the jaws, springs coiled about the rear cross bar and engaging the base and side bars to yieldably resist upward movement of the jaw to a set position, and a trigger pivoted to said base and extending forwardly between the strands of said lever and at its forward end provided with bait holding means, said trigger being bent to form a tooth adapted to engage said lever at the inner end of said side arm and releasably hold the jaw in a set position.

In testimony whereof I affix my signature.

EDWIN C. HARDESTY. [L. S.]